United States Patent [19]

Bordignon

[11] Patent Number: 4,922,361
[45] Date of Patent: May 1, 1990

[54] PRESSURE PAD, PARTICULARLY FOR MAGNETIC TAPES

[76] Inventor: Abramo Bordignon, Via Palmiro Togliatti, 32, 20030 Senago (Milano), Italy

[21] Appl. No.: 194,601

[22] Filed: May 16, 1988

[30] Foreign Application Priority Data

Jun. 1, 1987 [IT] Italy .................. 20742 A/87

[51] Int. Cl.⁵ .............. G11B 15/60; B65H 23/04; B65H 27/00
[52] U.S. Cl. ................. 360/130.31; 226/196; 242/76
[58] Field of Search ............ 360/130.31–130.34, 360/130.21; 226/196; 242/76

[56] References Cited

U.S. PATENT DOCUMENTS

| 3,682,486 | 8/1982 | Zwetzig et al. | 360/130.33 |
| 3,749,851 | 7/1973 | Nakamichi | 179/100.2 |
| 4,011,592 | 3/1977 | Kawada | 360/130 |
| 4,314,299 | 2/1982 | Ishida et al. | 360/130.33 |

FOREIGN PATENT DOCUMENTS

| 2376487 | 7/1978 | France . |
| 277365 | 11/1951 | Switzerland . |
| 2015803 | 9/1979 | United Kingdom . |
| 2018492 | 10/1979 | United Kingdom . |
| 2027676 | 2/1980 | United Kingdom . |

Primary Examiner—Robert S. Tupper
Attorney, Agent, or Firm—Guido Modiano; Albert Josif

[57] ABSTRACT

The pressure pad comprises a support body defining folded portions adapted for connection to retention pins a magnetic tape cassette, and a region bearing a plurality of monofilaments. The monofilaments each have one end fixed to the region of the support body, and another end adapted for contact engagement with a magnetic tape. The monofilaments can be made of conductive material for dispersing static electricity.

3 Claims, 2 Drawing Sheets

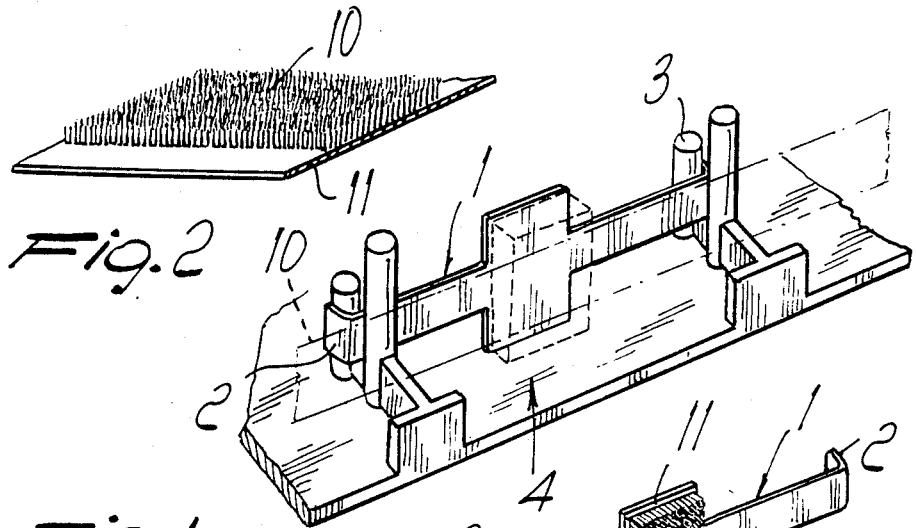
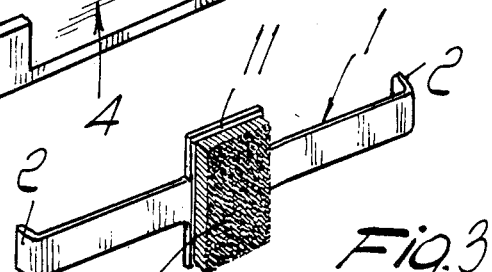
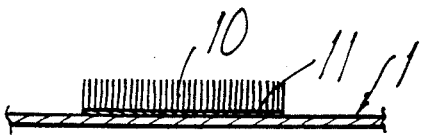
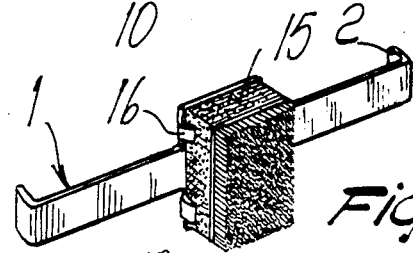
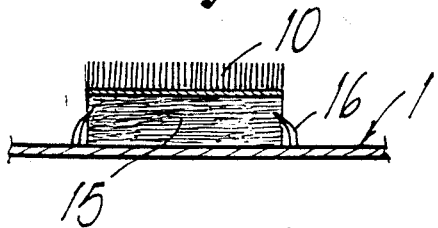
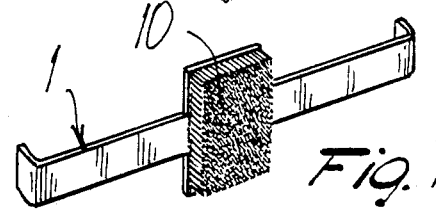
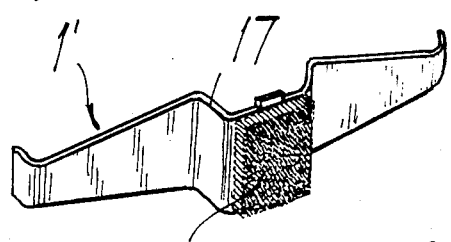

PRESSURE PAD, PARTICULARLY FOR MAGNETIC TAPES

BACKGROUND OF THE INVENTION

The present invention relates to a pressure pad, particularly for magnetic tapes.

As known, in magnetic tape recording and playback systems, such as audio, video or digital systems, the magnetic tape contacts fixed or rotating recording and playback heads and/or other fixed or movable elements, such as tape pressure pads and tape cleaning pads.

Consequently, pressure pads are required such as, e.g., leaf spring type pressure pads, tape-cleaning pressure pads etc., which are capable of ensuring a long working life of the magnetic tape, without causing wear of the tape and without causing any damage to the recording and playback heads.

Such presser pads must meet several requirements; they should keep the magnetic tape free from dust, have a low coefficient of friction, good anti-static characteristics, and be capable of assuming various configurations, without thereby creating localized pressure variations on the magnetic tape.

Pressure pads for magnetic tapes must also avoid creating any constriction in the normal translatory sliding movement of the magnetic tape.

Such pressure pads are also required to inhibit the transport of any fibers which may come loose due to wear of the pressure pad.

The current state of the art provides various types of low cost pressure pads which generally meet one of the above mentioned requirements.

Known pressure pads usually have a pad that is made of synthetic fibers so as to be relatively compact. However, pads made of pure wool or rabbit hair are also known.

This known type of pad made of synthetic fibers has the advantage of having a good coefficient of friction (K) equal to 0.15–0.18, and good dust confinement, which can be estimated at 7–8 mm$^3$/cm$^2$.

On the other hand, known pressure pads have long fibers which are susceptible to breakage and imply the use of extremely expensive materials.

Another disadvantage of the known pressure pads resides in the fact that the fibers are arranged at random on the pad, which can cause incorrect sliding of the magnetic tape.

Another known solution employs a base made of foamed polyurethane and applied to a leaf spring or to a tape-cleaning pad. A layer of material is then applied on said base for sliding contact engagement with the magnetic tape.

The use of a foamed polyurethane base provides good adaptability to the different profiles of the magnetic tape heads. However, the inherent elasticity of the base varies excessively when temperature variations occur, and the foamed polyurethane has a certain tendency to hydrolyze.

The foamed polyurethane base has a very low cost. A layer of material having a low coefficient of friction is applied onto the base. Such layer is often constituted by a polyester film which may have a graphite coating. Thus, a low coefficient of friction is achieved but no dust confinement is possible.

A nonwoven fabric is also sometimes constitutes the layer of material applied onto the base. Such fabric has a relatively low dust confinement, assessable at 2–3 mm$^3$/cm$^2$, and a relatively coefficient of friction (K=0.2–0.22).

The layer applied onto the base is also sometimes made of conductive teflon, which has a low coefficient of friction (K=0.15–0.18) and good antistatic characteristics. However, teflon does not allow dust confinement and is relatively expensive.

In magnetic tape pressure pads of the type adapted for cleaning the magnetic tape, pads capable of discharging static electricity are used. Such pads are constituted by a film of plastic material, which may be conductive or rendered conductive by application of a conductive material, such as graphite or teflon. These pads achieve a low coefficient of friction (K=0.15–0.18), but they are relatively expensive and do not allow dust confinement.

Another known solution resides in the manufacture of a synthetic pad. This solution is frequently used in magnetic tape pressure pads for audio cassettes. The synthetic pad has elastic qualities similar to wool, a very low loss of fibers, an acceptable coefficient of friction (K is approximately equal to 0.2), good dust confinement (with a value of approximately 5–6 mm$^3$/cm$^2$), and a relatively low cost.

Thus, while the various known types of pressure pads are advantageous from some points of view, they are not devoid of disadvantages. Therefore, the choice of the type of pressure pad depends in practice upon which advantageous aspect of the various known pressure pads is preferred.

SUMMARY OF THE INVENTION

The aim of the invention is to eliminate the disadvantages described above, by providing a pressure pad for magnetic tape, which can combine all of the advantages of the different known types of pressure pads.

Within this aim, an object of the invention is to provide a pressure pad having elastic pressure characteristics which are only minimally modified, even when subjected to considerable elastic deformation of the support of said pressure pad.

Another object of the present invention is to provide a pressure pad having an extremely low coefficient of friction, and an extremely high dust confinement capacity, reaching values that are not currently found in similar products.

A further object of the present invention is to provide a pressure pad which has extremely high adaptability to the different shapes of fixed or rotating heads and/or other elements, with substantially constant specific pressures in each point throughout the surface area of contact with the magnetic tape, thereby advantageously reducing wear of the magnetic tape and reducing the gap in the playback or recording region.

Another object of the present invention is to provide a pressure pad which does not impede correct sliding movement of the tape, thereby preventing incorrect tape movement which causes both playback and recording defects.

A not least object of the present invention is to provide a pressure pad which can easily be manufactured from readily available elements and materials, and which furthermore has reduced production costs.

The above described aim and objects, as well as other objects which will become apparent hereinafter, are achieved by a pressure pad, particularly for magnetic tapes, comprising a support body, at least one portion defined on said support body, a plurality of monofilaments each having at least one end and at least one other end, said one end of each of said monofilaments being fixed to said one portion of said support body, said other end of each of said monofilaments being adapted for contact engagement with a magnetic tape.

BRIEF DESCRIPTION OF THE DRAWINGS

Further characteristics and advantages of the invention will become apparent from the description of some preferred but not exclusive embodiments of a pressure pad, particularly for magnetic tape, as shown in the accompanying illustrative, non-limitative drawings, wherein:

FIG. 1 is a schematic perspective schematic view of a pressure pad applied to an audio cassette;

FIG. 2 is a schematic view of a layer of monofilament support material;

FIG. 3 is a perspective view of a pressure pad having monofilaments applied to a supporting layer which is glued to a support body;

FIG. 4 is a sectional view of the pressure pad of FIG. 3;

FIG. 5 is a perspective view of a pressure pad having monofilaments connected to a base body, fixed by claws onto a support body;

FIG. 6 is a sectional view of the pressure pad of FIG. 5;

FIG. 7 is a perspective view of a pressure pad having monofilaments applied directly to a support body;

FIG. 8 is a sectional view of the pressure pad of FIG. 7;

FIG. 9 is a perspective view of a pressure pad having a different configuration at a region, having monofilaments applied thereto;

DESCRIPTION OF THE PREFERRED EMBODIMENTS

Figure 10:
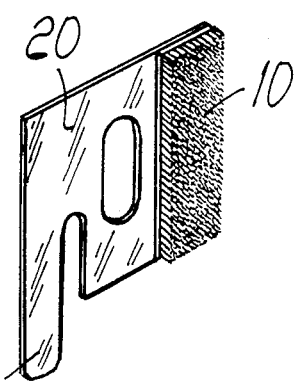
FIG. 10 is a perspective view of a pressure pad particularly for video cassettes.

With reference to the above described FIGS. 1 to 9, a pressure pad is illustrated which is constituted by a leaf spring of the type which is commonly used in audio cassettes. Said leaf spring, as shown in FIG. 3, has a support body 1 constituted by an elastic lamina made of metallic material. The lamina has at its free ends, coupling elements constituted, e.g., by folded portions 2. The folded portions 2 are fixable at retention pins 3, defined by the container of the cassette, generally indicated by the reference numeral 4.

The peculiar characteristic of the invention resides in the fact that said leaf spring 1 has, at a central portion or other magnetic tape contacting portion thereof, a plurality of monofilaments 10.

The monofilaments are each constituted by a long, thin element having an end which is embedded in a support and being stressed so as to deform under combined bending and compressive forces. From experimental tests it has been established that in practice, for an angle comprised between 20° and 80°; defined by the tangent at the terminal portion of the monofilament and the fixing plane of the monofilament, there occurs a variation of the elastic force which is contained within 27%, i.e. a force variable by less than + or − 13% for a considerable camber, which can be estimated at approximately 40% of the length of the monofilament.

To obtain said elements, monofilaments have been selected and cut to a predetermined measure by TOW techniques, to produce a velvet-like pad, with synthetic monofilaments having a quality, diameter, length and number of monofilaments per $cm^2$ according to well-defined values.

As already previously mentioned, a low coefficient of friction and good mechanical elasticity are required, as well as the possibility of using monofilaments having anti-static or conductivity characteristics. Synthetic monofilaments which can be used to meet these requirements are polyamide or acrylic monofilaments, polyester or cellulose triacetate monofilaments, or possibly other monofilaments having similar characteristics.

The dimensions of the monofilaments have been selected, by virtue of their greater commercial availability, which are comprised between 0.2 tex and 0.9 tex. This corresponds to diameters comprised between 15 microns and 32 microns.

From an analysis of the various parameters of the monofilaments, i.e. diameter, modulus of elasticity, one can determined in relation to the minimum camber of adaptability to the various configurations of the recording heads, which camber is of the order of 0.25 mm. Considering the average specific pressure recommended by international norms, assessable at approximately 1 $g/mm^2$, the selected limit values preferably provide the use of monofilaments having a diameter of 15 microns, a length of 0.6 mm and number of monofilaments assessable at approximately 400/$mm^2$. Alternatively, monofilaments may be used having a diameter of 20 microns, a length of 0.9 mm, and density of 200/$mm^2$. It is also possible to use monofilaments having a diameter of 32 microns, a length of 1.6 mm, and a monofilament density of 100 per $mm^2$.

The number, the diameter and the density of the monofilaments are in any case freely selectable even in ranges outside the above mentioned ones, which are those capable of producing the best characteristics.

From experimental tests, it has been observed that the coefficient of friction K is comprised between the optimum values of 0.10 and 0.17, and that there occurs a dust confinement having a greater value than what could be achieved in any of the known pressure pads.

For example, a polyamide monofilament having diameter of 20 microns, a length of 0.9 mm and density of 250 monofilaments per $mm^2$, a space for dust confinement greater than 32 $mm^3/cm^2$ is obtained.

Said monofilaments, selected according to the above described criteria, may be applied to a supporting layer indicated at 11 which, after being cut to size, is applied by glueing to the support body 1. The monofilaments 10 may be provided on a base body 15, which is retained on the supporting body by means of the claws 16, or possibly on a layer applied to the base body.

With reference to FIGS. 7 and 8, another solution consists of applying the monofilaments directly on the portion of the supporting body which is pressed elastically against the magnetic support, by treating the affected surface in a manner similar to the treatment performed on the monofilament supporting layer which is currently commercially available.

With this type of solution, production is drastically simplified, since it is not necessary to perform the successive application of an element with monofilaments to the supporting body constituted by the leaf spring. It is possible to apply the monofilaments directly onto said leaf spring.

Similarly, the monofilaments may be applied by glueing or by direct application to a leaf spring or supporting body, indicated by the reference numeral 1', which has in its central portion a protruding region 17, producing a leaf spring configuration of the type constituting the subject matter of a prior Italian published application (No. 20922 A/85 dated May 28, 1985), incorporated herein by reference.

Monofilaments arranged in this way have high stability for the different shapes of heads, and afford substantially constant specific pressures in every point of the surface area of contact with the magnetic tape.

This characteristic reduces tape wear and reduces the gap at the head, which is up to three times smaller than occurs with currently available pressure pads or tape cleaners.

This corresponds to an average working life of the magnetic recording and playback systems which is at least doubled with respect to current systems.

Furthermore, the use of a monofilament, which is disposed substantially perpendicular with respect to the tape and which is not connected to adjacent monofilaments, does not hinder movement of the magnetic tape. The monofilaments are arranged orthogonally with respect to the direction of movement of the magnetic tape, they have a unitary reaction force of a few milligrams and their adaptation to torsional movements of the flexed apex of the monofilament occurs with reaction forces of a few micrograms.

Another important aspect of the invention resides in the fact that said monofilaments have a very reduced cost with respect to previously mentioned currently used systems such as wool felt, synthetic felt and the like.

Another aspect not to be underestimated resides in the fact that the monofilaments cannot be entrained by any roughness or edge present on the magnetic support, so that there is no outward dispersion of monofilaments or the like, nor any impediment to correct sliding movement of the magnetic tape.

As known, in order to ensure a very long working life of magnetic tape recording systems, a very low coefficient of friction is required. It is known in tribology that, for a given material, the coefficient of friction and the specific pressure are mutually linked by an inverse correlation relationship.

Currently, the average specific pressures recommended by international norms must be of a few grams per $mm^2$. In the pressure pad according to the invention, regardless of the support material, the pad constituted by the monofilaments allows to achieve very low coefficients of friction.

Coefficients of friction are reduced considerably since the surface area of contact of the numerous monofilaments per $mm^2$, arranged substantially uniformly on the entire surface of the pad, is much less than one thousandth of the affected surface and extremely high-density micropressures with considerably high localized specific pressures are therefore determined. This in turn advantageously determines very low average coefficients of friction.

It should be added that the invention allows, without modifying the manufacturing process, to choose conductive monofilaments. These may be constituted by, e.g., carbon monofilaments or by polyamide monofilaments which are rendered conductive, for instance, by graphite-coating. Such conductive monofilaments are effective for discharging accumulated static electricity.

Figure 11:
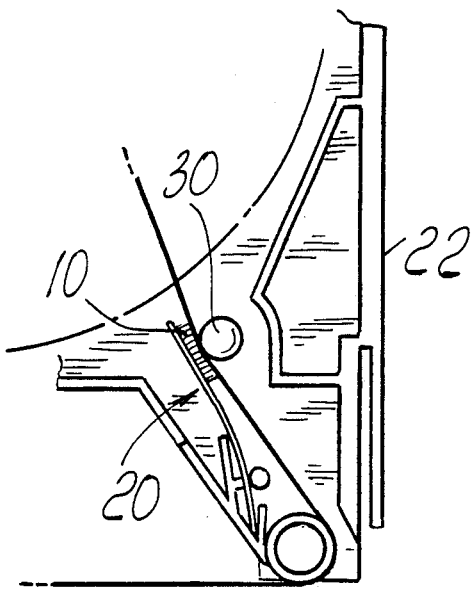
FIG. 11 is a schematic view of the pressure pad of FIG. 10 applied in a video cassette.
Figure 12:
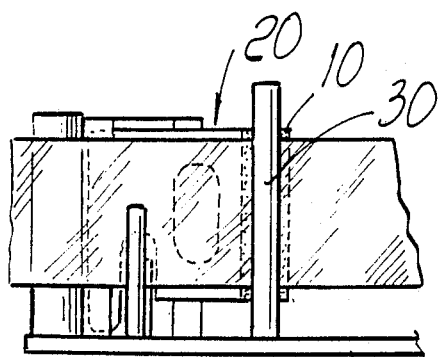
FIG. 12 is an elevational view of the pressure pad of FIG. 11 applied in the cassette.
Figure 13:
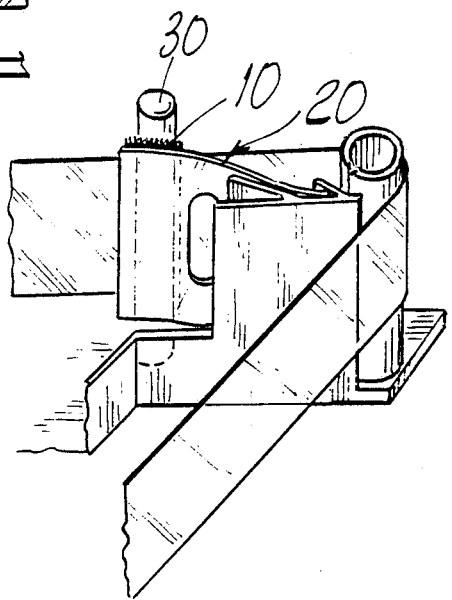
FIG. 13 is a perspective view of the pressure pad of FIGS. 10, 11 and 12, showing a side thereof opposite to the surface bearing the monofilaments.

This characteristic can be used advantageously when the pressure pad has tape-cleaning and static electricity elimination functions. Such type of pressure pad is schematically indicated in FIGS. 10 to 13.

This type of presser element has a support body 20, which has at one of its ends e.g., a tab 21, for coupling to the shell 22 of a video cassette. At the free end of the pressure pad is a plurality of monofilaments 10, which may have the same characteristics mentioned hereinabove in the description of the pressure pads illustrated in FIGS. 1–9.

The monofilaments 10 are provided in a region of the pressure pad having a transverse extension at least equal to the width of the magnetic tape.

Advantageously, the monofilaments 10 may have a transverse extension which is greater than the width of the tape, so that at least some of the monofilaments 10 engage by contact with the pin 30, which acts as an abutment and rest element in the region affected by the tape cleaner 20. In this way, a contact bridge is created which discharges static electricity directly onto the pivot. Discharged static electricity is exhausted through the system constituted by the pivot, the sensitive side of the tape and the final head. This also occurs in the previously described embodiments in which the presser applied to the leaf spring may affect the edges of the magnetic tape and discharge the static electricity onto the head.

Furthermore, with this type of arrangement, the longitudinal edges of the tape are also affected by the monofilaments, which clean the magnetic tape and discharge any static electricity.

From what has been described above it can thus be seen that the invention achieves the intended aim and objects, and in particular the fact is stressed that the provision of a pressure pad for magnetic tape, constituted by a plurality of monofilaments which are embedded at their base, allows to produce a system in which contact occurs in practice as combined bending and compressive stress on various monofilaments. This advantageously affords optimum pressure distribution, extremely advantageous coefficients of friction, together with the possibility of having extremely high dust confinement values.

The invention thus conceived is susceptible to numerous modifications and variations, all of which are within the scope of the inventive concept.

Moreover all the details may be replaced with other technically equivalent elements.

In practice, any materials shapes and dimensions may be used according to requirements.

I claim:
1. In combination, a pressure pad particularly for magnetic tapes, and a magnetic tape, said pressure pad comprising;
   a support body locatable proximate to said magnetic tape,
   at least one portion defined on said support body and being elastically pressed towards said magnetic tape by said support body,
   a plurality of monofilaments, at least one end defined by each monofilament in said plurality of monofilaments and being fixed to said one portion of said support body, at least one other end defined by each monofilament in said plurality of monofilaments and being in contact engagement said magnetic tape, wherein said monofilaments have a diameter comprised between 15 microns and 32 microns, a length comprised between 0.6 mm and 1.6 mm and a monofilament density comprised between 400 and 100 monofilaments per mm$^2$.

2. Combination according to claim 1, wherein said monofilaments are made of electrically conductive material.

3. Combination according to claim 1, wherein said monofilaments are made of synthetic plastic material, and wherein said synthetic plastic material is treated with an electrically conductive material.

* * * * *